United States Patent Office 3,026,271
Patented Mar. 20, 1962

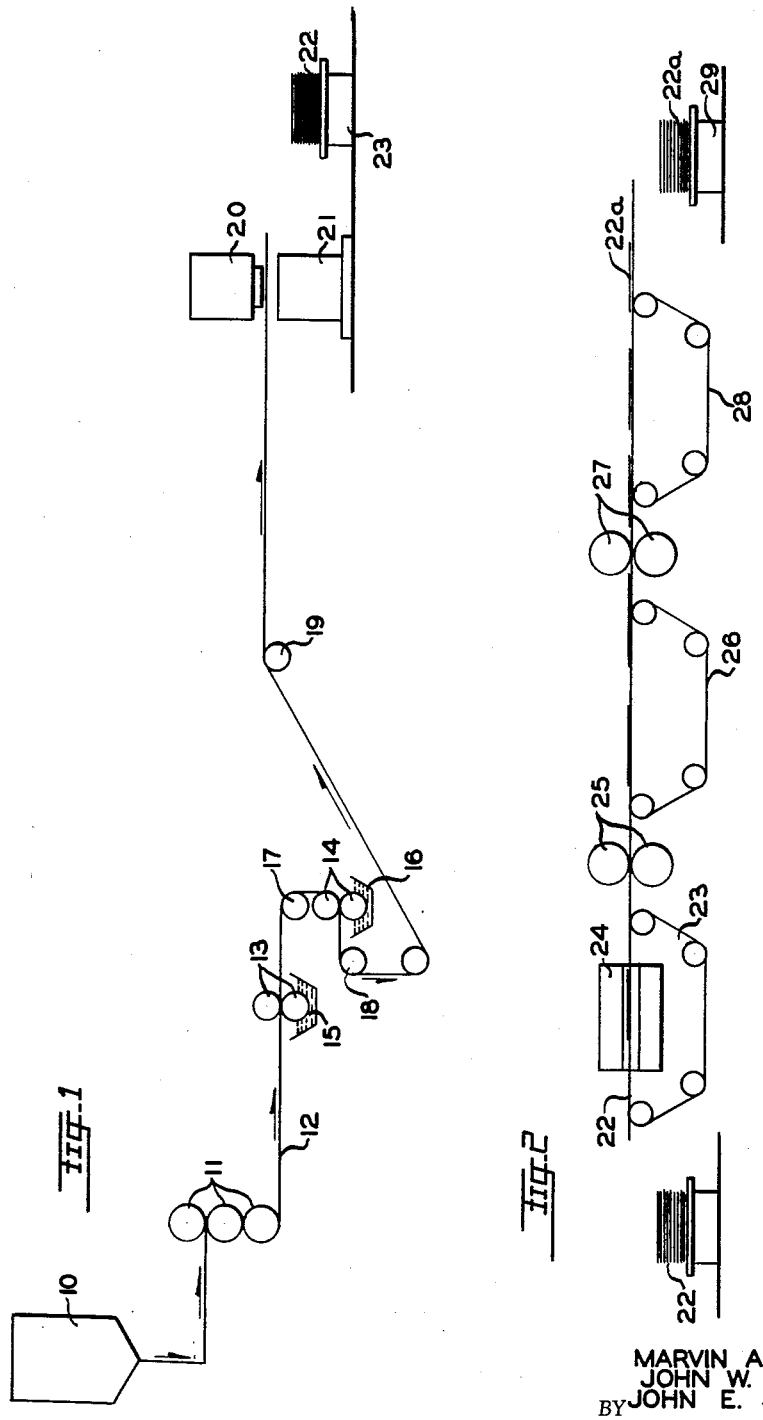

3,026,271
METHOD OF RENDERING UNVULCANIZED RUBBER EMBOSSABLE COMPRISING INCORPORATING THEREIN THE REACTION PRODUCT OF A CELLULOSIC MATERIAL AND AN EPOXY RESIN, AND PRODUCT OBTAINED THEREBY
Marvin Achterhof, John W. Henley, and John E. Schriner, Willoughby, and Miles Q. Fetterman, Painesville, Ohio, assignors to The Eagle-Picher Company, Cincinnati, Ohio, a corporation of Ohio
Filed Sept. 29, 1959, Ser. No. 843,222
19 Claims. (Cl. 260—2.3)

The present invention relates to an unvulcanized or uncured rubber article and, more particularly, to such an article and method of preparation which will permanently accept embossing and/or printing without incorporating a vulcanizing agent or otherwise curing the rubber.

Rubber sheets, mats, converings, and the like are used in many diverse applications such as a floor covering for an automobile. In order to make such coverings decorative and pleasing in appearance, it is desirable to emboss the rubber and preferably also to ink or color the covering and/or embossed areas thereof. Heretofore, it has been necessary to cure or vulcanize the mat, sheet, etc., which has not only added to the cost of the ultimate product but undesirably involved and prolonged the process of manufacture.

We have now developed a rubber compound which will accept printing and embossing without being cured. We have found that by incorporating a cellulosic material with the rubber and adding relatively small amounts of an epoxy resin, a rubber compound is obtained that can be easily sheeted and which readily accepts permanently subsequent embossing and/or printing.

It is, therefore, a principal object to provide a rubber compound that can be embossed and/or printing upon, as one would print a design upon a magazine page, without vulcanizing or curing the rubber.

Another object is to provide an unvulcanized rubber sheet, matting, covering or the like having a decorative embossed surface configuration and printed or inked portions on such configuration.

A further object is to provide a method of making such unvulcanized rubber compounds and products.

A still further object is to provide such a rubber compound from whole tire reclaimed rubber.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the annexed drawing:

FIGURE 1 is a schematic flow diagram and illustrates how a rubber compound of the present invention is converted into sheet form.

FIGURE 2 is a schematic flow diagram in continuation of FIGURE 1 and shows cut sheets being embossed and printed.

In carrying out the present invention, we admix rubber, a cellulosic material, and an epoxy resin. The mixture is then sheeted and after heating is immediately embossed and/or printed.

By "rubber" we contemplate those elastic materials commonly connoted by the term, whether of natural or synthetic origin. For example, rubber produced from the latex of plants, generally considered to include terpene hydrocarbons, may be used. By "rubber" we also contemplate those rubbers considered to comprise a polymer of the formula $(C_5H_8)_x$. Also, synthetic rubber polymers such as butadiene-styrene, butadiene-acrylonitrile, buta-isobutylene, polychloroprene, polysulfide polymers such as those made from ethylene dichloride and sodium tetrasulfide and the like may be employed. It is postulated that the reaction between the cellulosic material and the epoxy resin, hereinafter more fully described, contributes the attributes to whatever rubber is used which enable the rubber to be embossed and printed as herein described.

A very satisfactory rubber that may be used is reclaimed rubber and especially what is known in the art as whole tire reclaim. Not only is the latter preferred because it makes possible use of virtually scrap material, but the tire reclaim already contains the cellulosic material, usually in the form of rayon cords, which was initially incorporated in the tire to impart strength. Although certain tires are vulcanized during their manufacture, it will be apparent to those skilled in the art that whole reclaim tire rubber is obtained by so treating this or other like scrap rubber that it is "devulcanized." For example, the scrap rubber may be digested in a 4 to 5 percent aqueous solution of sodium hydroxide or zinc chloride at about 390° F. to about 400° F. and 200 p.s.i. for approximately 6 to 12 hours with agitation. After a water wash, the treated material is then allowed to settle followed by filtering to obtain the reclaimed material. Accordingly, such reclaimed material does not have the properties of vulcanized rubber, and it would still be necessary normally to vulcanize the reclaimed rubber if the properties afforded by vulcanization were required.

By "cellulosic material," we contemplate pure cellulose, $(C_6H_{10}O_5)_n$, as well as known derivatives thereof. For example, we may use regenerated cellulose, cellulose nitrate, cellulose acetate, rayon, cotton, cellophane, paper and wood in the form of chips or sawdust. For instance in using spruce, pine, hemlock, or balsam, small chips of the wood are treated with a solution of calcium hydrogen sulfite or sodium hydroxide in order to remove the non-cellulosic constituents. The product is then washed with water and bleached in a manner known in the art.

By "epoxy resin" is meant that class of resins known under a wide variety of designations such as epoxy, epoxide, ethoxy, ethoxyline, or oxirane. Such terms are derived from the fact that these resins are characterized by the functional group:

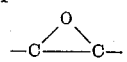

The epoxy resins are generally made by polymerizing epichlorohydrin and a bifunctional hydroxyl-containing compound, the latter generally having two hydroxyl groups per molecule. The more common dihydroxy compound which is used is bisphenol-A. However, other compounds which may be used include glycerol, resorcinol, cresol, and various glycols.

The type of epoxy resin used is not critical. Normally, the epoxy resins are polymers of varying molecular weight in the range of about 400 to about 8,000. During resin formation, the oxygen ring of the epichlorohydrin is thought to open to form linear polymers. The presence of a third reactive group can lead to cross-linking and resultant thermo-setting properties. The condensation reaction between epichlorohydrin and bisphenol-A is brought about in caustic media to produce the epoxy resins. By using an excess of epichlorohydrin, formation of the lower molecular weight liquid polymers is favored. When a higher proportion of bisphenol-A is included, the higher molecular weight solid resins contain both epoxide and hydroxyl groups capable of further reaction. It is the combination of these groups with polyfunctional reagents, such as polyamines and phenolic and urea resins, that makes possible cured resin possessing excellent strength and chemical resistance. Specific amines which may be used include diethylaminopropylamine, diethylenetriamine, ethylenediamine, triethylenetetramine, and triethanolamine. In one instance 20 parts by weight of triethanolamine per 100 parts by weight of an epoxy resin were used.

One manner of setting or converting the epoxy resin involves esterification of the epoxy and hydroxyl groups of the resin with organic acids. Especially when unsaturated fatty acids are used, the epoxy resin esters produced yield excellent coating vehicles that cure by a known drying oil mechanism. Curing may be accomplished at room temperature or more rapidly at higher temperatures, for example, 200° F.

The epoxy compositions can be varied in the time required for curing from a few minutes to more than a day. However, to hasten our method which is substantially continuous, as hereinafter described, we recommend use of a hardener or curative of the amine type. We prefer polyamides sold by General Mills, Inc., under the trademark of Versamide 120. In general, we understand that the basic chemistry of such polyamides involves the interreaction of dimerized linoleic acid with a di- or polyamine. Theoretically, if the dimer is represented by HOOC—R—COOH and the diamine by $$H_2N-R'-NH_2$$

there results, by condensation, a theoretical intermediate represented by HOOC—R—CONH—R'—NH$_2$. This molecule is highly functional, and can react with other molecules of dimer acid and diamine. As the reaction continues, a long chain results (molecular weight of 6,000–9,000).

By substituting a polyamine for the diamine, the condensation with dimer acid will yield polyamides which contain free primary or secondary amine groups spaced along the molecule. In the reaction of such a polyamide hardener with an epoxy resin, the terminal epoxy groups of the resin react with the amine groups spaced along the polyamide to give a highly complex cross-linked structure.

Epoxy resins are also described in U.S. Patent No. 2,506,486 and U.S. Patent No. 2,839,487 and further in "Technical Bulletin," SC:58–92, published December 1958, by the Shell Chemical Corporation. The preparation of polyamides described previously as hardeners or curatives for the present invention is disclosed in U.S. Patent No. 2,379,413 and reaction of polyamides with epoxy resins is disclosed in U.S. Patent No. 2,705,223. All of such publications are hereby incorporated by reference.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

The following are rubber compound formulas which may be used in parts by weight.

*Example I*

| | Parts |
|---|---|
| Rubber | 60 to 80 |
| Cellulosic material | 15 to 30 |
| Epoxy resin | 0.5 to 3 |

*Example II*

| | Parts |
|---|---|
| Rubber | 60 to 80 |
| Cellulosic material | 15 to 30 |
| Epoxy resin | 0.5 to 3 |
| Asphalt | 0.1 to 40 |

The asphalt preferably has a melting point within the range of about 325° F. to about 340° F. Softer varieties tend to make the rubber stock too sticky and harder varieties do not flux well with such stock.

*Example III*

| | Parts |
|---|---|
| Rubber | 60 to 80 |
| Cellulosic material | 15 to 30 |
| Epoxy resin | 0.5 to 3 |
| Asphalt | 0.1 to 40 |
| Carbon black | 0.1 to 40 |

For carbon black, the channel or furnace types of black tend to work best and preferably we blend the two types. This blend also produces best physical results such as tensile, elongation, tar, hardness, and low gravity with maximum reinforcement. This is not obtained by the use of clays, whiting and mineral fillers.

*Example IV*

| | Parts |
|---|---|
| Whole tire reclaim | 80 to 120 |
| Epoxy resin | 0.5 to 3 |
| Asphalt | 0.1 to 40 |
| Carbon black | 0.1 to 40 |

For reclaim rubber any type may be used but best results are obtained by using what is known in the art as whole tire reclaim. The whole tire reclaim of this example contained about 30 parts of rayon per 100 parts of reclaim.

*Example V*

| | Parts |
|---|---|
| Rubber | 60 to 80 |
| Cellulosic material | 15 to 30 |
| Epoxy resin | 0.5 to 3 |
| Asphalt | 0.1 to 40 |
| Carbon black | 0.1 to 40 |
| Polyamide resin (Versamide 125) | 1 to 5 |

Versamide 125 is a polyamide of the type described in the previously cited U.S. Patent No. 2,379,413.

*Example VI*

| | Parts |
|---|---|
| Whole tire reclaim | 100 |
| Epoxy resin | 0.75 |
| Asphalt | 30 |
| Carbon black | 25 |
| Polyamide resin (Versamide 125) | 1.25 |

The whole tire reclaim contained about 30 parts of a cellulosic material as rayon. This is our preferred formula considering all economies such as cost, gravity, and processing. To improve the latter, a small amount of stearic acid or other mineral oil type of softener (one part or less) can be added.

In preparing an unvulcanized rubber article in accordance with the present invention, the rubber compound is first mixed on a mill or in an internal type of mixer such as a Banbury mixer 10 (FIGURE 1). For larger amounts of an epoxy resin and curative therefor, a split type of mixing may be used in which the epoxy resin is mixed in one portion and the curative is mixed in a second portion. These two portions are then admixed in the Banbury mixer and while still warm the admixture is then processed between calendar rolls 11 to form a sheet or ribbon 12 of suitable thickness and width. At the time of calendering, a lubricant and an adhesive may be applied by contact rolls 13 and 14, respectively, from their corresponding supply tanks 15 and 16. Soapy water may be used as the lubricant, and a latex emulsion may be used as the adhesive. An example of the latter includes a 50–50 mix of a latex emulsion of acrylonitrile-butadiene copolymer and a latex emulsion of styrene-butadiene copolymer, such latex emulsions being substantially of equal concentration. Usually the lubricant is added to one side of the mat or sheet stock, while the adhesive is coated on the reverse side, and therefore reversing rollers 17 and 18 are used. Thereafter the sheet travels for a given space over a roller 19 to cool and is finally severed by a clicker or die knife 20 over an anvil 21 into mat blanks 22 which are collected on a pallet 23. The sheet 12 may be pulled through the described apparatus by conventional means not shown, for example, by cooperating pull rolls stationed ahead of the die knife and anvil.

As illustrated in FIGURE 2, the mat blanks 22 are next placed on an endless conveyor 23 and carried through a heater 24 which may be gas fired or steam or electrically heated. The mats are heated to at least about 200° F., preferably to about 250° F., and of course in no event to a temperature sufficiently high to decompose the mats. Although it is thus necessary to heat the mats 22, the heating is at a relatively low temperature and for a relatively short period of time as compared to that necessary for vulcanization. The conveyor 23 immediately passes the heated mats 22 between embossing rolls 25 and onto a second continuous conveyor 26 which passes the mats between printing rolls 27. A third continuous conveyor 28, all of which are conventionally power driven, deposits the finished mats 22a on a pallet 29. The mats permanently hold the embossing and printing. If desired, it is possible to send the sheet or ribbon 12 directly from the applicator rolls 13 and 14 to the embossing rolls 25, using the heater 24 if needed. This technique eliminates the intermediate cooling step and makes the overall process continuous. The sheet is then cut into individual mats as before.

By inking the embossing roll, a color can be deposited in the recess created simultaneously by the embossing rolls. The color may be deposited in the depressions or "valleys" as a first operation, and then a second color may be printed on the remaining flat portion of the mat to enhance its attractiveness. As a further alternate procedure, a solid color or pattern may be printed on a flat mat blank which is then embossed with a second color. It is also possible to print two or more colors on a flat sheet and then merely emboss a design in the mat stock without depositing another color in the depressions. As a still further alternate procedure, it is possible to coat or color a flat sheet, emboss this coated sheet, and then coat or color the embossed sheet. This procedure provides a two color sheet without the need for inking the embossing roll.

It will now be apparent that we have provided a rubber compound that can be embossed and/or printed upon without vulcanizing the rubber. The resulting product has a decorative embossed surface configuration with printed or inked portions on such configuration. Our method and resulting product may also utilize reclaimed rubber preferably already containing some celllulosic material as in the form of rayon.

Other forms embodying the features of the invention may be employed, change being made as regards the features herein disclosed, provided those stated by any of the following claims or the equivalent of such features be employed.

We therefore particularly point out and distinctly claim as our invention:

1. An unvulcanized rubber sheet adapted to accept printing without curing consisting essentially of in major portion a rubber and in minor portion the reaction product of a cellulosic material and an epoxy resin.

2. An unvulcanized rubber sheet adapted to accept embossing without curing consisting essentially in parts by weight of about 60 to about 80 parts of unvulcanized rubber, and about 15 to about 30 parts of a cellulosic material, at least some of said cellulosic material being reacted with an epoxy resin.

3. An unvulcanized rubber sheet adapted to accept embossing and printing without curing consisting essentially in admixture in parts by weight of about 60 to about 80 parts of unvulcanized rubber, about 15 to about 30 parts of a cellulosic material, and about 0.5 to about 3 parts of an epoxy resin, said resin being reacted with said cellulosic material to enable said product to acquire permanently an embossed configuration without vulcanizing the rubber.

4. The unvulcanized rubber sheet of claim 3 wherein said epoxy resin has a molecular weight within the range of about 400 to about 8,000.

5. An uncured, permanently embossed rubber sheet consisting essentially of the following in approximately these parts by weight:

Rubber _____ 60 to 80
Cellusosic material _____ 15 to 45
Epoxy resin _____ 0.5 to 3 wherein said cellulosic material and epoxy resin are chemically interreacted and such resulting reaction product enables said sheet to acquire permanently such embossing without cure.

6. An uncured, permanently embossed rubber sheet consisting essentially of the following in approximately the indicated parts by weight:

Rubber _____ 60 to 80
Cellusosic material _____ 15 to 45
Epoxy resin _____ 0.5 to 3
Asphalt _____ 0.1 to 40 wherein said cellulosic material and epoxy resin are chemically interreacted and such resulting reaction product enables said sheet to acquire permanently such embossing without cure.

7. An uncured, permanently embossed rubber sheet adapted to accept printing, said rubber sheet consisting essentially of the following in approximately the parts by weight indicated:

Rubber _____ 60 to 80
Cellusosic material _____ 15 to 45
Epoxy resin _____ 0.5 to 3
Asphalt _____ 0.1 to 40
Carbon black _____ 0.1 to 40 wherein said cellulosic material and epoxy resin are chemically interreacted and such resulting reaction product enables said sheet to accept such printing and to acquire permanently such embossing without cure.

8. An uncured, permanently embossed rubber sheet adapted to accept printing, said rubber sheet consisting essentially of the following in approximately the parts by weight indicated:

Rubber _____ 60 to 80
Cellulosic material _____ 15 to 45
Epoxy resin _____ 0.5 to 3
Asphalt _____ 0.1 to 40
Carbon black _____ 0.1 to 40
Polyamide curative _____ 1 to 5 wherein said cellulosic material and epoxy resin are chemically interreacted and such resulting reaction product enables said sheet to accept such printing and to acquire permanently such embossing without cure.

9. An unvulcanized, permanently embossed rubber sheet having printed areas in the recesses of such embossed configuration, said rubber sheet consisting essentially of the following in approximately the parts by weight indicated:

Whole tire reclaim (including about 30 parts of
  rayon) _____ 100
Epoxy resin _____ 0.75
Asphalt _____ 30
Carbon black _____ 25
Polyamide hardener _____ 1.25 wherein said asphalt has a melting point within the range of about 325° F. to about 340° F. and wherein said rayon and epoxy resin are chemically interreacted and such resulting reaction product enables said sheet to accept printing in said printed areas and to acquire permanently such embossing without cure.

10. A method of rendering unvulcanized rubber embossable without vulcanizing the rubber comprising the steps of incorporating a cellulosic material into the rubber, and then reacting an epoxy resin with such material.

11. A method of adapting uncured rubber for embossing without vulcanizing the rubber comprising the steps of incorporating in parts by weight about 15 to about 45 parts of a cellulosic material into about 60 to about 80 parts of unvulcanized rubber, then adding an epoxy resin to such mixture and reacting such resin with at least some of such material.

12. A method of treating unvulcanized rubber to adapt it permanently to accept embossing and printing without curing the rubber comprising the steps of incorporating in parts by weight about 15 to about 45 parts of a cellulosic material into about 60 to about 80 parts of unvulcanized rubber, then adding about 0.5 to about 3 parts of an epoxy resin to such mixture, and reacting such resin with such cellulosic material whereby the rubber can acquire permanently an embossed configuration without vulcanizing the rubber.

13. The method of claim 12 wherein such epoxy resin has a molecular weight within the range of about 400 to about 8,000.

14. The method of claim 12 wherein such mixture further includes about 0.1 to about 40 parts by weight of asphalt.

15. The method of claim 12 wherein such mixture further includes about 0.1 to about 40 parts by weight of asphalt and about 0.1 to about 40 parts by weight of carbon black.

16. The method of claim 12 wherein such mixture further includes about 0.1 to about 40 parts by weight of asphalt, about 0.1 to about 40 parts by weight of carbon black, and about 1 to about 5 parts by weight of a polyamide curative to effect such cellulosic-epoxy resin reaction.

17. A method of treating unvulcanized rubber to adapt it permanently to accept embossing and printing without vulcanizing the rubber comprising the steps of incorporating in parts by weight about 15 to about 45 parts of a cellulosic material into about 60 to about 80 parts of unvulcanized rubber, then adding about 0.5 to about 3 parts of an epoxy resin to such mixture, converting the mixture to sheet form, heating the resultant sheet to a temperature within the range of about 200° F. to below a temperature effective to decompose such mixture, and then embossing such heated sheet whereby a permanently embossed configuration is imparted.

18. The method of claim 17 wherein said rubber is present in about 70 parts by weight, said cellulosic material is present in about 30 parts by weight, such epoxy resin is present in about 0.75 part by weight and wherein such mixture further includes about 30 parts of asphalt, about 25 parts of carbon black, and about 1.25 parts of a polyamide curative, said asphalt having a melting point within the range of about 325° F. to about 340° F.

19. A method of utilizing vulcanized rubber scrap containing a cellulosic material without further vulcanization comprising the steps of treating such scrap to devulcanize it and obtain reclaimed rubber containing such cellulosic material, admixing with a major portion of such reclaimed rubber a minor portion of an epoxy resin, reacting the cellulosic material of the reclaimed rubber with the epoxy resin, converting the admixture to sheet form, and then embossing and printing such sheet in the absence of vulcanization.

References Cited in the file of this patent

UNITED STATES PATENTS

| 2,599,817 | Evans et al. | June 10, 1952 |
| 2,842,513 | Fitzgerald et al. | July 8, 1958 |
| 2,872,427 | Schroeder | Feb. 3, 1959 |
| 2,886,473 | Schroeder | May 12, 1959 |

OTHER REFERENCES

Whitby: "Synthetic Rubber," John Wiley and Sons, Inc., New York, pages 399 and 412 relied upon (1954).